United States Patent [19]
Gessinger

[11] Patent Number: 5,167,294

[45] Date of Patent: Dec. 1, 1992

[54] AUXILIARY LIQUID COOLING SYSTEM FOR USE ON SNOWMOBILE

[76] Inventor: Raymond Gessinger, R.D. #1, Fultonville, N.Y. 12072

[21] Appl. No.: 748,921

[22] Filed: Aug. 22, 1991

[51] Int. Cl.⁵ .............................................. B62M 27/02
[52] U.S. Cl. ....................................... 180/190; 165/47; 180/68.4
[58] Field of Search ............... 180/190, 191, 192, 193, 180/68.4, 68.1, 182, 68.2; 237/12.3 A, 12.3 B; 165/47, 42

[56] References Cited

U.S. PATENT DOCUMENTS

| | | | |
|---|---|---|---|
| 3,835,948 | 9/1974 | Duclo | 180/5 |
| 3,901,335 | 8/1975 | Johnson | 180/5 |
| 3,970,164 | 7/1976 | Suzuki | 180/68.4 |
| 4,008,777 | 2/1977 | Yasuro | 180/5 |
| 4,249,626 | 2/1981 | Fields et al. | 180/68.4 |
| 4,618,020 | 10/1986 | Noda et al. | 180/68.4 |

Primary Examiner—David M. Mitchell
Attorney, Agent, or Firm—Kevin R. Kepner

[57] ABSTRACT

An auxiliary liquid cooling system for snowmobiles that is easily adapted as an aftermarket item and provides both auxiliary engine cooling capacity and added operator warmth. The auxiliary cooling system consists of a small automotive type radiator mounted along one or both sides of a snowmobile drive tunnel in a position just above the front operator footrests. The engine cooling liquid flows through the radiators in addition to the factory heat exchangers adding extra cooling capacity. The turbulence created by the rotating clutch and drive members aid the airflow through the radiators and cause the warmed air to be directed toward the operator.

4 Claims, 3 Drawing Sheets

AUXILIARY LIQUID COOLING SYSTEM FOR USE ON SNOWMOBILE

BACKGROUND OF THE INVENTION

The present invention relates to cooling systems for snowmobiles and more particularly provides an auxilary engine cooling/passenger warming system for liquid cooled engine snowmobiles. Liquid cooled engine powered snowmobiles are now widely known and very popular. The current designs which incorporate various methods of cooling systems for the engines all have several shortcomings toward which the present invention is addressed.

Many popular models of today's snowmobiles utilize heat exchanger devices located in the drive track tunnel to take advantage of the snow itself to aid the cooling effect. Such devices are described in U.S. Pat. Nos. 3,835,948 to Duclo; and 3,901,335 to Johnson. Under certain circumstances however, to wit: operation of the vehicle on hard packed, icey, groomed trails which are gaining in popularity in many areas, there is not sufficient snow thrown up by the endless track to adequately cool the heat exchanger. As a result riders must either stop and manually throw snow onto the heat exchanger or simply stop and Other designs utilize a radiator mounted in the engine compartment such as that described in U.S. Pat. No. 4,008,777 to Yasuro et al. but further require a cooling fan to function properly and cannot be added as an aftermarket item but must be designed into the snowmobile.

The present invention is designed to be added to any model snowmobile with a liquid cooled engine and adds additional cooling capacity to the system. It provides the further advantage of directing the warm air flowing from the cooling device to be directed toward the operator of the vehicle to provide additional warmth to the operator. It further requires no fans or other devices to function, utilizing only the air flow created by the rotation of the vehicle clutch itself.

SUMMARY OF THE INVENTION

The present invention provides a small radiator type heat exchanger mounted in the area between the drive tunnel and the cowling of a snowmobile, just above the front footrest, area or areas of the vehicle. The cooling medium is connected into the radiator by means of flexible hoses or tubing at one of several locations depending upon the vehicle model. The small radiator can be added to the factory cooling system by either diverting the coolant flow through the radiator before it flows to the main heat exchanger of after it leaves the main heat exchanger and before returning to the engine block. A pair of radiators can also be utilized, one being before the main heat exchanger and the second being after the main heat exchanger in the cooling loop.

In operation, when the vehicle is not moving the airflow caused by the rotating clutch causes air to flow from the engine compartment through the heat exchanger and rearward toward the leg or legs of the operator. When moving the increased airflow through the engine compartment facilitates more efficient cooling.

If desired a pair of radiators can be utilized, one on each side of the drive tunnel so as to increase cooling efficiency particularly for high performance machines and create added warmth for the operator. The warm air flowing from the radiator can further be used as a temporary hand warming device or as an aid to deice goggles, helmet visors etc.. A bypass built into the system can be used to disconnect the auxilary cooler when additional engine cooling and/or operator warmth is not needed.

DETAILED DESCRIPTION OF THE DRAWINGS

Figure 1:
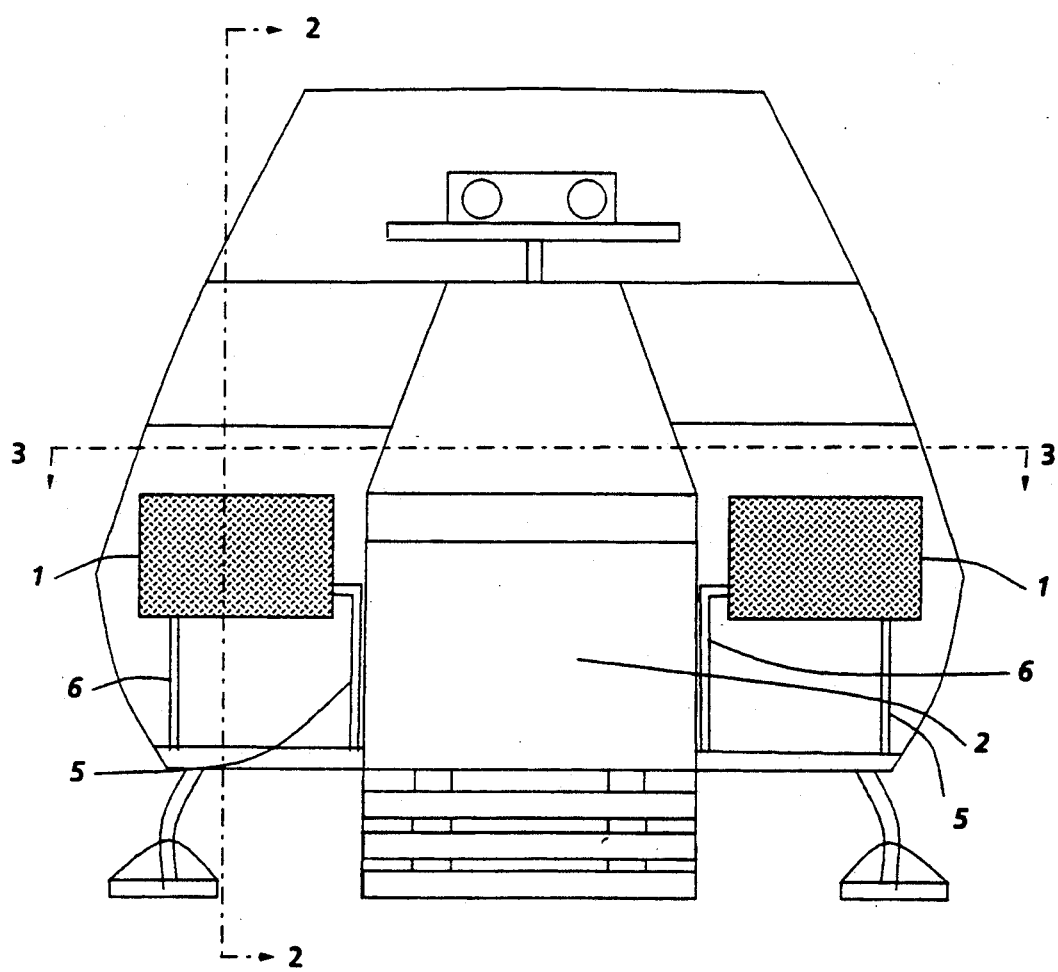
FIG. 1 is a rear view of a snowmobile showing a dual application of the present invention.
Figure 2:
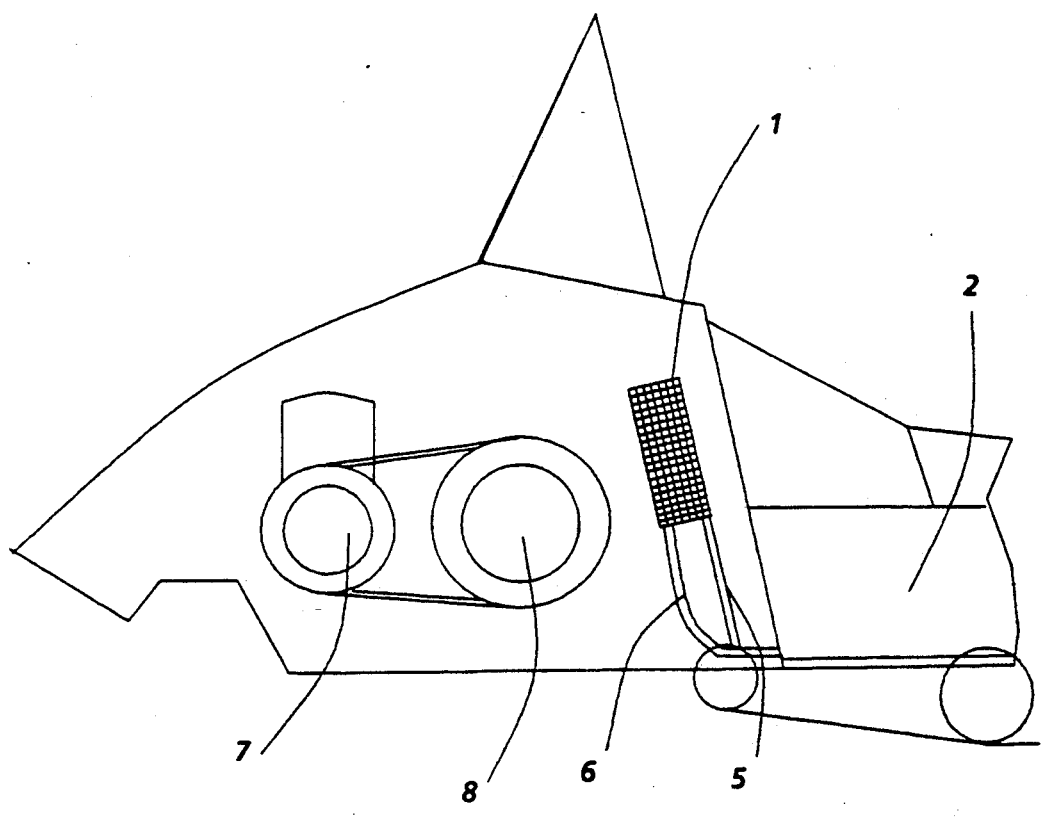
FIG. 2 is a partial sectional side view along line A—A' of FIG. 1.
Figure 3:
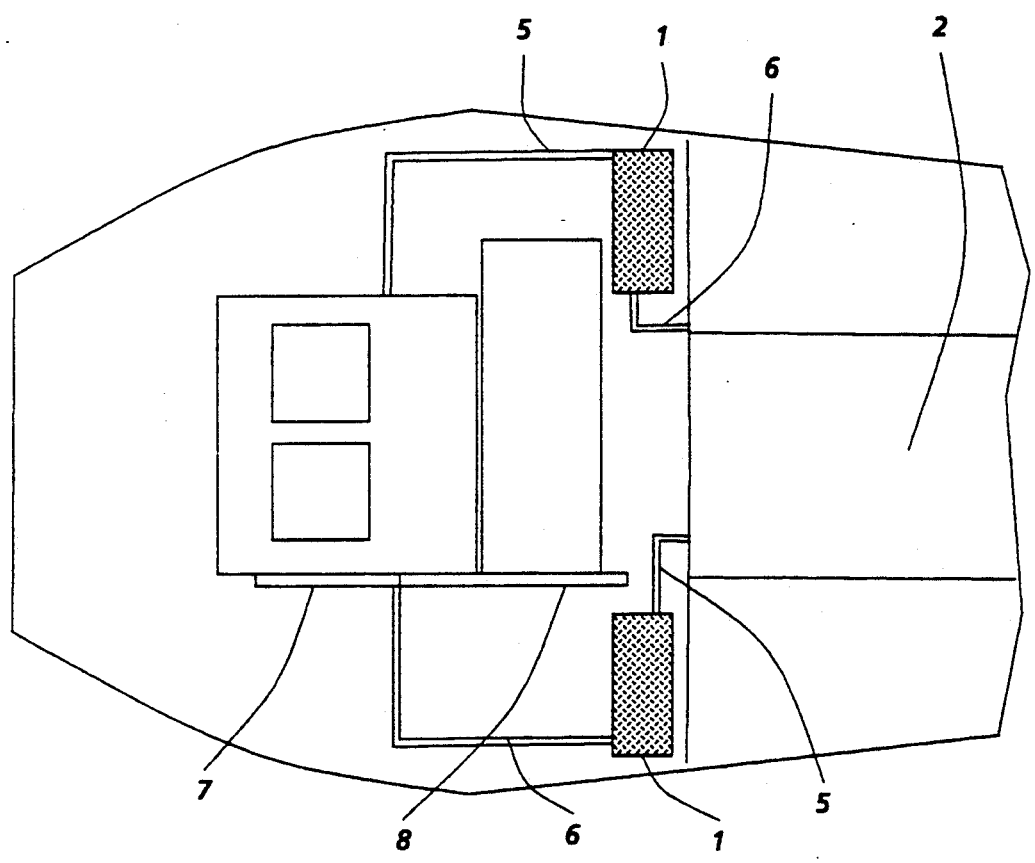
FIG. 3 is a partial sectional top view along line B—B' of FIG. 1.

As seen in FIG. 1 the radiator 1 of the present invention is shown mounted between the drive tunnel 2 of the snowmobile and the cowling 3. The main heat exchanger is located within the drive tunnel. FIG. 2 shows the relationship of the radiator 1 and the normal footrest 4 of the vehicle. The flexible input tubing 5 and output tubing 6 is also seen. The main heat exchanger in the illustrated embodiment is located between the two auxiliary radiators 1 in the coolant flow path. The clutch 7 and vehicle drive unit 8 which rotate and provide an air flow to aid in the heat exchange are shown in both FIGS. 2 and 3. As can be seen in FIG. 3 the rearward airflow from the rotating drive members 7 and 8 is directed rearward through the radiator and toward the vehicle operator.

Since certain changes in the foregoing disclosure are readily apparent without departing from the scope of the invention herein described, the foregoing disclosure is intended to be construed in an illustrative sense and not in any manner a limiting sense.

What is claimed is:

1. An auxiliary liquid cooling system for snowmobiles in which a snow engaging endless track drive unit is positioned in a longitudinally extending tunnel, wherein the upper side of the tunnel defines a seated operator area, said snowmobile including a compartment for a liquid cooled engine adjacent the forward and of the tunnel, and a primary heat exchanger is located within the drive tunnel of the vehicle comprising:

a secondary heat exchanger means positioned so that engine compartment airflow will pass through said heat exchanger to the operator area of said snowmobile;

a means for delivering engine coolant between the primary heat exchanger to said secondary heat exchanger;

a means for removing engine coolant from said secondary heat exchanger.

2. A device as in claim 1 wherein:

said heat exchanger means comprises an automotive type finned tubular radiator;

said engine coolant delivering means comprises a flexible tubular means adapted at one end to the high temperature outlet of the engine coolant circulation path and at a second end to the input of said secondary heat exchanger;

said engine coolant removing means comprises a flexible tubular means adapted at one end to the output of said secondary heat exchanger and at a second end to the low temperature inlet of said engine coolant circulation path.

3. A device as in claim 2 wherein:

said automotive type radiator is fixedly mounted between the drive tunnel of said snowmobile and a forward cowling of said snowmobile in a position above a footrest provided for the operator.

4. A device as in claim 2 wherein:

a plurality of said automotive type radiators are fixedly mounted on two sides of said drive tunnel of said snowmobile, each in a position above footrests provided for said operator.

* * * * *